US010659506B2

(12) United States Patent
Davies et al.

(10) Patent No.: US 10,659,506 B2
(45) Date of Patent: *May 19, 2020

(54) SIMILAR INTRODUCTION ADVERTISING CACHING MECHANISM

(71) Applicant: Google LLC, Mountain View, CA (US)

(72) Inventors: Scott Davies, Mountain View, CA (US); Justin Lewis, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,238

(22) Filed: May 10, 2019

(65) Prior Publication Data

US 2019/0268395 A1    Aug. 29, 2019

Related U.S. Application Data

(63) Continuation of application No. 15/140,203, filed on Apr. 27, 2016, now Pat. No. 10,298,646.

(51) Int. Cl.
*G06F 15/167* (2006.01)
*H04L 29/06* (2006.01)
(Continued)

(52) U.S. Cl.
CPC .......... *H04L 65/60* (2013.01); *G06F 12/0862* (2013.01); *G06Q 30/0277* (2013.01);
(Continued)

(58) Field of Classification Search
CPC .......... H04N 21/23418; H04N 21/812; H04N 21/44008; H04N 21/2407; H04N 21/4532;
(Continued)

(56) References Cited

U.S. PATENT DOCUMENTS 7,039,699 B1 * 5/2006 Narin ..................... G06Q 30/02
709/207
7,860,996 B2    12/2010 Musayev et al.
(Continued)

FOREIGN PATENT DOCUMENTS

CN      102804725 A      11/2012
WO      WO-2012/164360 A1   12/2012
WO      WO-2013/148003 A1   10/2013

OTHER PUBLICATIONS

International Preliminary Report on Patentability for Appln. Ser. No. PCT/US2016/069611 dated Feb. 15, 2018 (27 pages).
(Continued)

*Primary Examiner* — Michael A Keller
*Assistant Examiner* — Thao D Duong
(74) *Attorney, Agent, or Firm* — Foley & Lardner LLP

(57) ABSTRACT

A method for reducing bandwidth needed for streaming media content. The method includes identifying, by the streaming media server, a subset of a plurality of media content items having a portion of media data in common and extracting, by the streaming media server, the common portion from a first media content item of the subset; generating, by the streaming media server, a common media package comprising the extracted common portion, providing, by the streaming media server to a client media device, the common media package, and receiving, by the streaming media server from the client media device, a request for an item of content. The method also includes selecting an item of content from the subset; and transmitting, by the streaming media server to the client media device, an identification of the common media package and an identification of a chunk of the selected item of content subsequent to the common portion.

18 Claims, 5 Drawing Sheets

(51) Int. Cl.

| | |
|---|---|
| *G06F 12/0862* | (2016.01) |
| *H04N 21/2343* | (2011.01) |
| *H04N 21/258* | (2011.01) |
| *H04N 21/433* | (2011.01) |
| *H04N 21/442* | (2011.01) |
| *H04N 21/472* | (2011.01) |
| *H04N 21/6587* | (2011.01) |
| *H04N 21/845* | (2011.01) |
| *H04N 21/858* | (2011.01) |
| *H04N 21/81* | (2011.01) |
| *H04L 29/08* | (2006.01) |
| *G06Q 30/02* | (2012.01) |

(52) U.S. Cl.
CPC ............ *H04L 67/146* (2013.01); *H04L 67/18* (2013.01); *H04L 67/2842* (2013.01); *H04L 67/2847* (2013.01); *H04L 67/42* (2013.01); *H04N 21/2343* (2013.01); *H04N 21/25891* (2013.01); *H04N 21/4331* (2013.01); *H04N 21/44222* (2013.01); *H04N 21/47202* (2013.01); *H04N 21/6587* (2013.01); *H04N 21/812* (2013.01); *H04N 21/8456* (2013.01); *H04N 21/8586* (2013.01); *H04L 65/602* (2013.01)

(58) Field of Classification Search
CPC .. H04N 19/105; H04N 19/172; H04N 19/176; H04N 19/513; H04N 21/2387; H04N 21/6125; G06F 3/0482; G06F 3/04842
See application file for complete search history.

(56) References Cited

U.S. PATENT DOCUMENTS

| | | | |
|---|---|---|---|
| 8,949,452 B2 | 2/2015 | Harrang et al. | |
| 2007/0136741 A1 | 6/2007 | Stattenfield | |
| 2008/0191816 A1* | 8/2008 | Balachandran | ......... H04L 47/10 333/24 R |
| 2009/0099911 A1* | 4/2009 | Ota | ........................ G06Q 30/02 705/14.66 |
| 2011/0213958 A1* | 9/2011 | Lindholm | ............... H04L 63/18 713/153 |
| 2012/0076357 A1* | 3/2012 | Yamamoto | ......... G06K 9/00711 382/103 |
| 2012/0079059 A1 | 3/2012 | Fonseca et al. | |
| 2014/0297881 A1 | 10/2014 | Shivadas et al. | |
| 2015/0086033 A1* | 3/2015 | Tebbs | ..................... H04L 65/60 381/77 |
| 2017/0078729 A1* | 3/2017 | Karlsson | ................ H04L 67/12 |

OTHER PUBLICATIONS

International Search Report arid Written Opinion for Appln. Ser. No. PCT/US2016/06911 dated Mar. 31, 2017 (14 pages).
Non-Final Office Action on U.S. Appl. No. 15/140,203 dated Jun. 28, 2018 (18 pages).
Notice of Allowance on U.S. Appl. No. 15/140,203 dated Jan. 9, 2019 (9 pages).
Office Action on EP Appln. Ser. No. 16836192.1 dated May 27, 2019 (9 pages).
Office Action on KR Appln. Ser. No. 10-2018-7016251 dated Jul. 19, 2019 (8 pages).
Foreign Action other than Search Report on CN 201680074010.7 dated Mar. 20, 2020.

* cited by examiner

SIMILAR INTRODUCTION ADVERTISING CACHING MECHANISM

CROSS-REFERENCE TO RELATED APPLICATION

This application claims the benefit under 35 U.S.C. § 120 as a continuation of U.S. patent application Ser. No. 15/140,203, filed Apr. 27, 2016, which is hereby incorporated by reference in its entirety.

BACKGROUND

Items of content on the Internet, such as videos, pictures, audio recordings, text, interactive games, quizzes, or other such content, may be used by content providers to advertise products and services for consumers to purchase. Such content may be displayed as the user views a video, sometimes referred to as a broadcast, stream, program, film, feed, or by other such names.

SUMMARY

Streaming technology makes it possible to watch on-demand video without downloading a copy directly to the mobile computing device. Videos include common introductory scenes that the user repeatedly re-streams resulting in wasted bandwidth and battery life. By identifying and storing the common introductory scenes, a user may have an improved viewing experience by minimizing the time to stream video content, server performance may be improved, and network bandwidth usage reduced.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Many items of media content, such as videos, podcasts, music, or other recordings, have the same content within the first few seconds of playback. For example, a video may display a production brand, a copyright disclaimer, an approval message from a standards rating organization (in the case of a movie trailer), or other common opening content. Downloading each of these introduction scenes by the client will delay the download of the remainder of the media content requested by the client, in addition to consuming extra battery life and memory usage on the client's device. Caching systems that focus on entire files do not address this problem as the remaining content, after the first few seconds, of each item of media content may be different.

Accordingly, the present disclosure is directed to systems and methods to decrease the transfer or loading time for media content streamed or downloaded to a client device, reducing or eliminating the latency associated with the download of these intro scenes, so to improve the user's experience.

Figure 1:
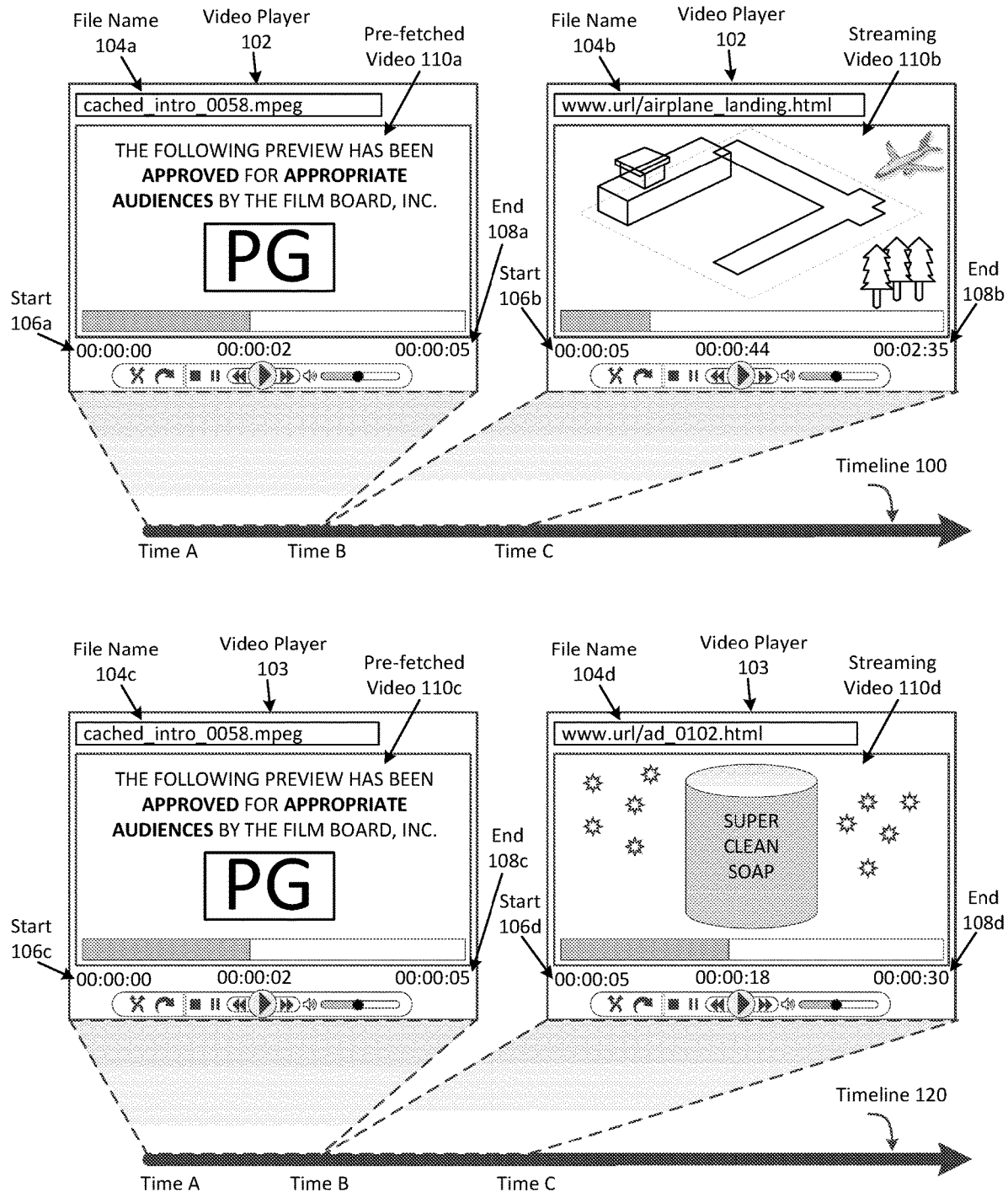
FIG. 1 is a diagram of the playback of a pre-fetched video followed by the playback of a streaming video on a timeline, according to one implementation.

FIG. 1 is an illustration depicting two timelines of media content having a common or shared introductory sequence. The system discussed herein may identify and extract similar introduction sequences and pre-fetches and stores the introduction sequence on the client device, which may, in some implementations, be done prior to the client requesting the media. When the client then requests the media content, the client may retrieve and display the pre-fetched intro or common content from local storage, while the client streams (and buffers) or downloads the rest of the content from the server. In some implementations, this may even be done prior to the server selecting which content, from a plurality of media content items having the common intro, to deliver to the client. For example, FIG. 1 illustrates the playback of two different streaming videos, where each video is preceded by the same 5-second introductory scene displaying a standards board rating for the streaming content (e.g., PG). As the client device requests and buffers the streaming video beginning at time B of the timelines, the client device may start the playback of the pre-fetched introductory content. As a result, the client does not need to re-download the same introductory content previously retrieved and/or viewed on the client device. In some implementations, the cached introductory content is given a higher quality score in a content selection auction system, which increases the chance of content items having the common or shared introductory sequence being shown.

The present systems and methods also cover instances where streamed media items have the same visual content during the introduction sequence, but have differing audio. In such implementations, the system may display pre-fetched visual content along with an audio sample provided in the first response from the server, reducing the bandwidth needed for the first response. In some implementations, the server may provide instructions for modifying the pre-fetched video data, so that the client may seamlessly transition to a subsequent portion of the data (e.g. by fading to black or a different color, by displaying a predetermined frame, etc.).

In greater detail, FIG. 1 is an illustration of playback of a pre-fetched introductory sequence followed by the playback of a remaining portion of the streaming media on a timeline 100, 120, according to one implementation. Timelines 100, 120 represent alternate timelines with selection and presentation of different content having a common introductory sequence, and may be referred to generally as timeline 100. Timeline 100 may include the playback of pre-fetched video 110a having a filename 104a using video player 102 on a client device. Timeline 120 may include the playback of pre-fetched video 110c having a filename 104c using video player 103 on a client device. As shown, timeline 100 and timeline 120 display the same pre-fetched video (e.g., cached_intro_0058.mpeg). In some implementations, video player 102 and video player 103 are the same video media player, such as an embedded video player in a web browser, a video player application, or other such media interface. Although each filename is shown with an .mpeg extension, the media payload may be stored in any video format (e.g., 3g2, 3gp, avi, fly, mov, MPEG-1, MPEG-2, MPEG-4, mpg), any audio format (e.g., MP3), any archive format (e.g., ZIP), or any other media container formats.

The video playback of the pre-fetched video has both a start and an end. Start 106*a* on timeline 100 and start 106*c* on timeline 120 both correspond to time A on their respective timelines, while end 108*a* on timeline 100 and end 108*c* on timeline 120 correspond to time B on their respective timelines. Each start (e.g., 00:00:00) and end (e.g., 00:00:05) use a time formatting of hours:minutes:seconds in the example shown. The duration of the playback may represent the difference in time between the pair of start and end points on each timeline. Although shown with a 5 second duration of time, in many implementations, the pre-fetched video may have different playback times, such as 1 second, 30 seconds, 1 minute, 1 hour, or any other duration of playback time of a video.

In addition, each timeline may include the playback of additional streaming video content. As shown, timeline 100 includes the playback of streaming video 110*b* having a filename 104*b* (e.g., www.url/airplane_landing.html) using video player 102 on a client device. Timeline 100 includes the playback of streaming video 110*d* having a filename 104*d* (e.g., www.url/ad_0102.html) using video player 103 on the same client device. In some implementations, video player 102 and video player 103 are the same video media player.

Similar to the playback of the pre-fetched video, the playback of the streaming video also has both a start and an end. Start 106*b* on timeline 100 and start 106*d* on timeline 120 both correspond to time B on their respective timelines, while end 108*b* on timeline 100 and end 108*d* on timeline 120 correspond to time C on their respective timelines. Although shown with certain durations of time, in many implementations, the streaming video content may have different playback times, such as 1 second, 30 seconds, 1 minute, 1 hour, or any other duration of playback time of a video.

The streaming media may be delivered to the client using any protocol, such as datagram protocol (UDP), real-time streaming protocol (RTSP, real-time transport protocol (RTP), real-time transport control protocol (RTCP), HTTP protocol, TCP, Unicast, Multicast, IP Multicast, peer-to-peer. In some implementations, the streaming video content is first downloaded to client before displaying on the video player. For example, in response to receiving the requested content, the client may first download the streaming content to a memory storage internal to the device. In one implementation, the client device may download the streaming content to a database that is in communication with the device (e.g., RAM, ROM, memory card, internal or external hard drive, USB flash drive, database). The streaming content may be saved in any video format (e.g., 3g2, 3gp, avi, fly, mov, mpeg-1, mpeg-2, mpeg-4, mpg), any audio format (e.g., mp3), any archive format (e.g., zip), or any other known or later discovered media container formats. Once saved or downloaded, the client device may render the saved content using the client device's video player.

Prior to the request by the client device for streaming content, the client device may have pre-cached a common media package, which includes the media payload (e.g., introductory content) and a common media identifier (e.g., an address to the media payload stored on the client device). In some implementations, the client device may determine that the common media package associated with the requested streaming content has not been previously received and stored by the client device. Therefore, in such instances, the client device may send a request to a media server for a copy of the common media package. In other implementations, the media server may have previously transmitted or pushed the common media package to one or more media devices including the client device, without receiving a request by the client. The push of the common media package may be based on one or more triggering events such as a modification to the common media package (e.g., updates), a time event (e.g., a specific time of day, week, month, year, or any other time combination), calendar events, updates to a file describing the user's interest (e.g., a cookie file located on the client device shows that the client now has an interest in sailboats), or search requests made by the user.

In some implementations, client devices may share and transfer common media packages between one another. For example, a first client device that requests streaming content that requires a cached copy of a common media package in order to display the introductory content may request the common media package from the media server, if the common media package is not currently cached on the client device. In some implementations, the client device may instead receive the common media package from a second client device associated with the first client device instead of requesting from the media content server. For example, a user may have a mobile phone and desktop computer. The desktop computer may have already pre-fetched a copy of the common media package associated with a movie. Accordingly, when the desktop computer receives the common media package, it may then send the common media package to the mobile phone in response to a request from the mobile phone. Therefore, if the user decides to watch the first half of the movie on the desktop and the second half on the mobile phone, the user will not have to wait to download the common media package when viewing on the mobile phone. In some implantations, the desktop shares the common media package with the mobile phone even without a request from the mobile phone.

Still referring to FIG. 1, the streaming video is displayed once the introductory content ends. To ensure such a seamless display of the two videos, streaming video 110*b* may need to be buffered on a client device for a certain amount of time prior to the start of the video playback of pre-fetched video 110*a*. For example, a client device may request a movie. After sending a request to receive the movie to a media server, the client device may determine that the common media package containing the 3-second introductory scene to the movie has already been pre-fetched and cached on its internal memory. However, if the delivery of the movie is excessively delayed (e.g., due to poor network conditions, intentional or non-intentional delays by the media server due to licensing or other issue), then displaying the 3-second introductory scene before buffering the movie will prevent the seamless display of the two videos.

The streaming video may include one or more clips, movies, films, television episodes or series, commercials, advertisements, user-created content, documentaries, musicals, or multimedia streams. Accordingly, a streaming video (e.g., streaming video 110*b*, streaming video 110*d*) may be associated with any one or any combination of video content or programming.

Figure 2:
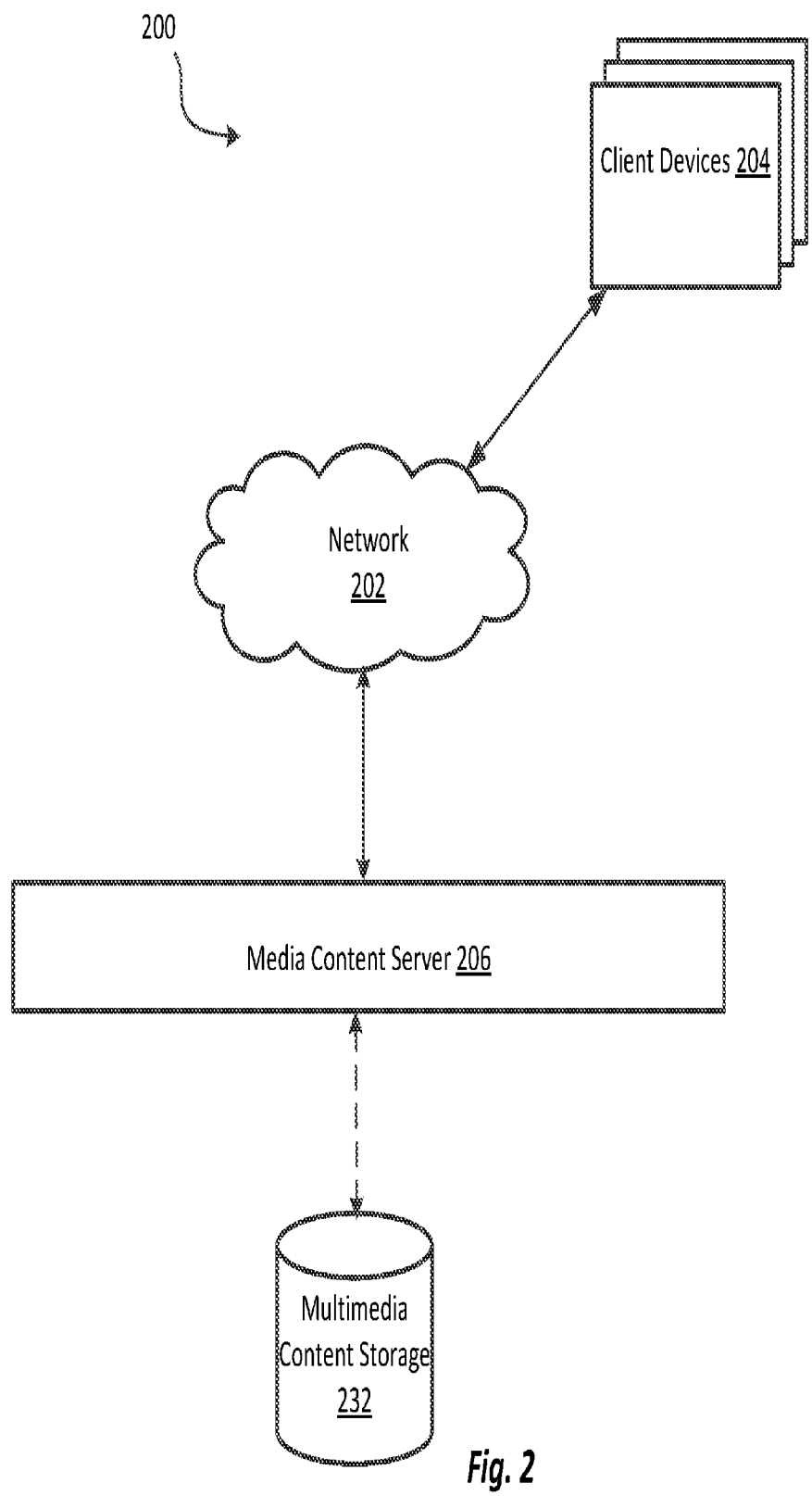
FIG. 2 is a block diagram of an example environment for reducing bandwidth needed for streaming media content to a client device.

FIG. 2 is a block diagram of an example environment 200 for reducing bandwidth needed for streaming media content to a client device. The environment 200 includes a media content server 206 that provides streaming multimedia content (e.g., videos, films) including providing a common media package that is relevant to the streaming multimedia content. The example environment 200 includes a storage device, such as multimedia content storage 232, which stores multimedia content received or gathered from network 202 by media content server 206, as well as, the common media package generated by the media content server 206. The example environment 200 may include network 202, e.g., a local area network (LAN), wide area network (WAN), the Internet, or a combination of these or other networks, that connects a client device 204 with media content server 206. The environment 200 may include many thousands of client device 204. Although not illustrated, in many implementations, network 202 may comprise one or more intermediary devices, including gateways, routers, firewalls, switches, network accelerators, WiFi access points or hotspots, or other devices.

A client device 204 is an electronic device that is under control of a user and is capable of requesting and receiving resources and items of content over the network 202. Example client device 204 include personal computers, mobile communication devices (e.g., smartphones or tablets), and other devices that can send and receive data over the network 202. A client device 204 typically includes a user application, e.g., a web browser or a media player application, to facilitate the sending and receiving of data over the network 202.

Figure 3A:
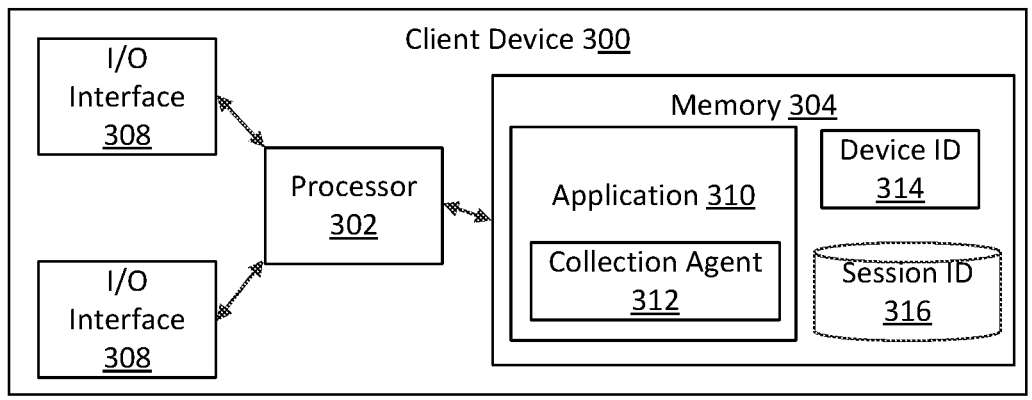
FIG. 3A is a block diagram of a client device, according to one implementation.

FIG. 3A is a block diagram of one implementation of a client device 300 of a client, such as a client device 204. Client device 300 may be any number of different types of user electronic devices configured to communicate via a network, including without limitation, a laptop computer, a desktop computer, a tablet computer, a smartphone, a digital video recorder, a set-top box for a television, a video game console, or any other type and form of computing device or combinations of devices. In some implementations, the type of client device 300 may be categorized as a mobile device, a desktop device or a device intended to remain stationary or configured to primarily access a network via a local area network, or another category of electronic devices such as a media consumption device.

In many implementations, client device 300 includes a processor 302 and memory 304. Memory 304 may store machine instructions that, when executed by processor 302 cause processor 302 to perform one or more of the operations described herein. Processor 302 may include a microprocessor, ASIC, FPGA, etc., or combinations thereof. In many implementations, processor 302 may be a multi-core processor or an array of processors. Memory 304 may include, but is not limited to, electronic, optical, magnetic, or any other storage devices capable of providing processor 302 with program instructions. Memory 304 may include a floppy disk, CD-ROM, DVD, magnetic disk, memory chip, ROM, RAM, EEPROM, EPROM, flash memory, optical media, or any other suitable memory from which processor 302 can read instructions. The instructions may include code from any suitable computer programming language such as, but not limited to, C, C++, C#, Java, JavaScript, Perl, HTML, XML, Python and Visual Basic.

Client device 300 may include one or more network interfaces 306. A network interface 306 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network or other computing devices. In many implementations, client device 300 may include a plurality of network interfaces 306 of different types, allowing for connections to a variety of networks, such as local area networks or wide area networks including the Internet, via different sub-networks.

Client device 300 may include one or more user interface or input/output devices 308. A user interface device 308 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 300, such as a built-in display, touch screen, microphone, etc., or external to the housing of client device 300, such as a monitor connected to client device 300, a speaker connected to client device 300, etc., according to various implementations.

Client device 300 may include in memory 304 an application 310 or may execute an application 310 with processor 302. Application 310 may be an application, applet, script, service, daemon, routine, or other executable logic for receiving content and for transmitting responses, commands, or other data. In one implementation, application 310 may be a web browser, while in another implementation, application 310 may be media presentation application. Application 310 may include functionality for displaying content received via network interface 306 and/or generated locally by processor 302, and for transmitting interactions received via a user interface device 308, such as requests for websites, selections of survey response options, input text strings, etc.

In some implementations, application 310 may include a collection agent 312. Collection agent 312 may include an application plug-in, application extension, subroutine, browser toolbar, daemon, or other executable logic for collecting data processed by application 310 and/or monitoring interactions of a user with an interface 308. In other implementations, collection agent 312 may be a separate application, service, daemon, routine, or other executable logic separate from application 310 but configured for intercepting and/or collecting data processed by application 310, such as a screen scraper, packet interceptor, API hooking process, or other such application.

Collection agent 312 may be configured for intercepting or receiving data input via user interface device 308, including mouse clicks, scroll wheel movements, gestures such as swipes, pinches, or touches, or any other such interactions; as well as data received and processed by application 310 including content displayed or media played, start time, end time, and duration of playback, as well as interactions with playback controls including pausing, resetting or restarting, fast forwarding, muting, or any other such interactions. Collection agent 312 may identify streamed multimedia content received by a client device, such as a television show, movie, song, music video, or other such content, in addition to its associated common media package. Content may be identified based on identifier tags including ID3 tags or other such metadata, uniform resource locators (URLs) or uniform resource identifiers (URIs), filenames, captions, titles, or any other type and form of data accompanying the content. Collection agent 312 may identify or track playback or view time durations or cumulative playback times of multimedia content.

Client device 300 may include or be identified with a device identifier 314. Device identifiers 314 may include any type and form of identification, including without limitation a MAC address, text and/or numerical data string, a username, a cryptographic public key, cookies, device serial numbers, user profile data, network addresses, or any other such identifier that may be used to distinguish the client device 300 from other client devices 300. In some implementations, a device identifier 314 may be associated with one or more other device identifiers 314 (e.g., a device identifier for a mobile device, a device identifier for a home computer, etc.). In many implementations, to preserve privacy, the device identifier 314 may be cryptographically generated, encrypted, or otherwise obfuscated. In some implementations, client device 300 may include a session identifier 316 which may be similar to a device identifier 314 but generated more frequently, such as hourly, daily, upon activation of application 310, or any other such period. Session identifier 316 may be generated by a client device 300 or received from a server, content provider, or other device. Session identifier 316 may be used in place of device identifiers 314 to increase anonymity, or may be used in connection with device identifiers 314 to distinguish interactions of one session from those of another session. A session may include one or more requests for multimedia content (e.g., streaming content media, common media package) and each session may include a time and/or date record associated with each session.

Collection Agent 312 may be configured to deliver device identifiers 314, session identifiers 316, and any data collected by collection agent 312 to a database (e.g., multimedia content storage 232). The storing of copies of such data in a database has the advantage of being available to a media content server (e.g., media content server 318) in the event that client device 204 is disconnected from the network (e.g., network 202), is transmitting or receiving data in a poor signal environment (e.g., fading), or is powered-down.

Figure 3B:
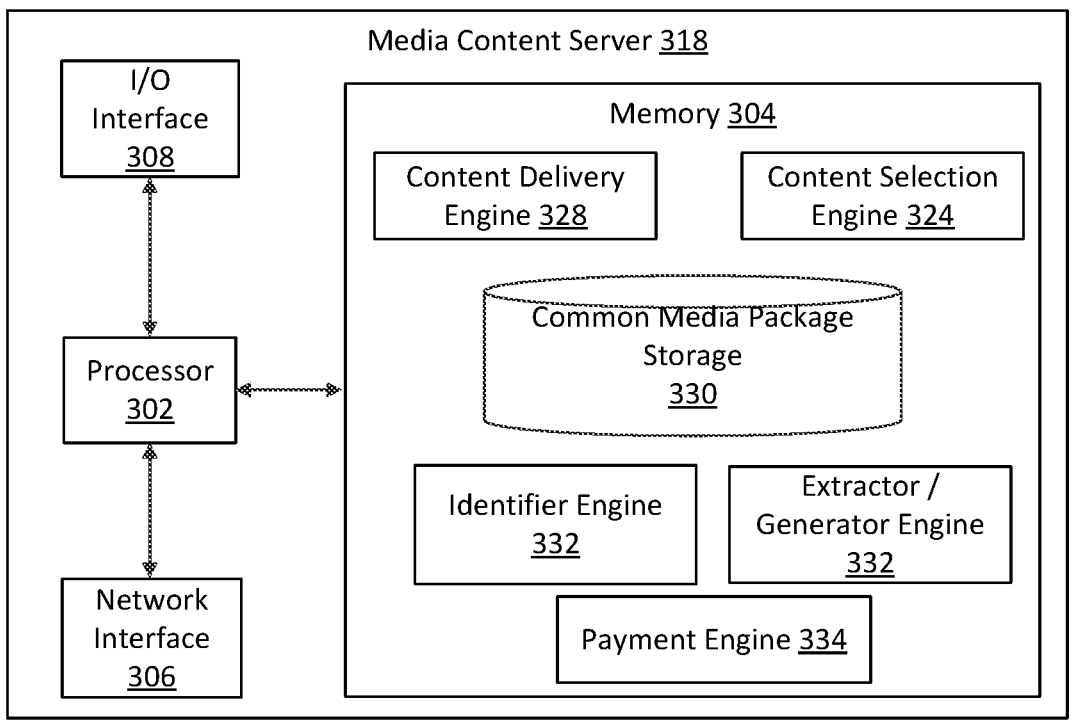
FIG. 3B is a block diagram of a media content server, according to one implementation.

Referring now to FIG. 3B, is a block diagram of a media content server 318, according to one implementation, such as media content server 206 of FIG. 2. As with client device 300, a media content server 318 may include one or more processors 302, memories 304, network interfaces 306, and user interfaces 308. In some implementations referred to as headless servers, a media content server 318 may not include a user interface 308, but may communicate with client devices 300 with user interfaces 308 via a network. Memory 204 may include common media package storage 330, which stores the common media package extracted and generated by extractor/generator engine 336. In some implementations, memory 304 may store one or more applications 310 (not illustrated) for execution by processor 302 of the media content server 318, including FTP servers, web servers, mail servers, file sharing servers, peer to peer servers, or other such applications for delivering content stored in multimedia content storage 232 and common media package storage 330.

Media content server 318 may include a content selection engine 324. A content selection engine 324 may comprise an application, service, routine, server, daemon, or other executable logic for selecting content from multimedia content storage 232 responsive to a request from client device 300 comprising one or more identifiers. A request by a client device 300 for multimedia content (e.g., streaming multimedia content) or a common media package (e.g., introductory multimedia content) may include a device identifier (e.g., device identifier 314), session identifier (e.g., session identifier 316), request date and time, keyword, genre, type, creator, creation date, unwatched flag, or any other type and form of identification or characteristic. Content selection engine 324 may identify one or more items of multimedia content in multimedia content storage 232 matching the characteristics or identifiers in the request. In addition, content selection engine 324 may identify a common media package in multimedia content storage 232 that is associated with the requested multimedia content. Content selection engine 324 then delivers the selected multimedia content and common media package to content delivery engine 328, to be delivered to client device 300. In some implementations, content selection engine 324 may limit the number of selected items of multimedia content, returning 10, 20, 50 or any other predetermined number of items.

Content management server 318 may include a content delivery engine 328. A content delivery engine 328 may comprise an application, service, routine, server, daemon, or other executable logic for selecting multimedia content and a common media package from multimedia content storage 232 responsive to a request from client device 300 comprising one or more identifiers. In some implementations, content delivery engine 328 may receive one or more items of content or a common media package from content selection engine 324 and deliver each to one or more client devices. In other implementations, content delivery engine 328 may receive a list of one or more content items from content selection engine 324 and deliver the list to one or more client devices. In other implementations, content delivery engine 328 will retrieve one or more content items found on the list from a database, such as multimedia content storage 232, and deliver the one or more items to one or more client devices. In some implementations, content delivery engine 328 will insert computer code (e.g., C, C++, TCL, PERL, VBA, HTML, Hyperscript, VBscript, Flash, etc) into the one or more items of sponsored content that cause a browsers on the client device to navigate to a resource location coded into the sponsored content.

Media content server 318 may include an identifier engine 332. An identifier engine 332 may comprise an application, service, routine, server, daemon, or other executable logic for identifying a subset of a plurality of media content items in multimedia content storage 232 having a portion of media data in common. In some implementations, identifier engine 332 may identify one or more subsets of media items by executing process 400 shown in FIG. 4, described below. Identifier engine 332 may start by selecting, from multimedia content storage 232, a first item of content that is not already assigned to a subgroup and a second item of content that is assigned to a subgroup. Identifier engine 332 then proceeds to compare the multimedia content existing in a particular portion of time or "timeslot" of the first item of content with a particular timeslot of the second item of content (e.g. corresponding frames, seconds, minutes, or any other such duration of time, referred to generally herein as a timeslot). In some implementations, the same timeslots are compared, while in other implementations, a first timeslot or portion of the first item may be compared to a portion in a sliding window moved across the duration of the second item, or within a range (e.g. plus or minus 10 seconds). In addition, the comparison is based on both the video information and audio information of the items of content. In other implementations, the comparison is based on either the video content or the audio content.

Multimedia content may be compared using a variety of different techniques. For example, in one implementation, identifier engine 332 may perform a cryptographic hashing function (e.g., MD5) on the multimedia content occurring within one timeslot of the first media item to compute a first hash value. Identifier engine 332 may perform the same cryptographic hashing function on the multimedia content occurring within one timeslot of the second media item to compute a second hash value. Identifier engine 332 may then compare the first hash value with the second hash value. If the hash values match, then the two compared timeslots of multimedia content are equal.

In some implementations, the same timeslot indexes are compared. For example, the first timeslot (e.g., the first 1 second, the first 2 seconds, the first 3 seconds) of the first media item may be compared to the first timeslot of the second media item. In some implementations, different timeslot indexes are compared, possibly to account for a phase or temporal shift between the compared videos. For example, assuming a first media item contains 1 second of blank footage, followed by 5 seconds of common footage and then 30 seconds of a short length movie, and a second media item contains 5 seconds of common footage followed by 2 hours of a long length movie, if each timeslot is 1 second long, then identifier engine 332 may compare a hash of the second timeslot (e.g., 00:00:01 to 00:00:02) of the first media item with a hash of first timeslot (e.g., 00:00:00 to 00:00:01) of the second media item. In many implementations, this comparison may be performed iteratively: the first timeslot (e.g. frame, second, 10 seconds, etc.) of the first media item may be compared with the corresponding first timeslot of the second media item; then the next timeslot; then the third timeslot; etc. In some implementations, the comparison may use non-overlapping windows (e.g. comparing one frame to a first frame, second frame, third frame, etc.), while in other implementations, the comparison may use overlapping windows (e.g. comparing a five second portion to seconds 1-5 of the second media item, then seconds 2-6, then seconds 3-7, etc.). In many implementations, the comparison may be performed on the visual content in its entirety, while in other implementations, the comparison may be performed on a subset of the content. In some such implementations, identifier engine 332 may compare the hash value of spatial portions of each media item. For example, identifier engine 332 may compare hash values computed from a first macro block of a frame (e.g (e.g., an 8×8 or 16×16 pixel region), or a top half of each time slot, middle half of each time slot, or bottom half of each time slot of each media item. In some implementations, identifier engine 332 may compare the pixels of each media item, e.g. pixel-to-pixel. In some implementations, identifier engine 332 may compare a group of pixels in the first media item to a group of pixels in the second media item. In another implementation, identifier engine 332 may compare an average value of a frame of video (e.g. average color value, average brightness, etc.) to an average of another frame of video of the second media item. In a further implementation, only if the averages match, then identifier engine 332 may perform a more detailed comparison (e.g. macroblock by macroblock, pixel by pixel, etc.) of each frame. In a different further implementation, the identifier engine may compare successive average values of frames to corresponding average values of frames of the second media item. For example, if an average brightness of five successive frames are [0.3, 0.4, 0.7, 0.6, 0.2], the identifier engine 332 may identify a similar sequence of frames of the second media item. In other implementations, identifier engine 332 may compare audio of the first media item to corresponding audio of the second media item, or may compare embedded data such as closed captioning data included in a blanking interval of the first media item to corresponding closed captioning data included in a blanking interval of the second media item.

If the comparison is a match, then identifier engine 332 counts and records the number of timeslots in the second item of content that match the timeslots of a third item of content selected from the same subgroup. For example, after the identifier engine 332 finds a match between the first 3 seconds of a first item of content (unassigned to a subgroup) and the first 3 seconds of a second item of content (assigned to a subgroup), the identifier engine 332 must then determine what remaining portion of the first item of content must match the second item of content in order to be added to the subgroup. To make this determination, identifier engine 332 must compare the second item of content (assigned to the subgroup) with another item of content that is also assigned to the same group. From this comparison, identifier engine 332 may determine the number of seconds of content, beyond the first 3 seconds, that each item of member of the subgroup have in common with one another. For instance, the second item of content may have 15 seconds in common with the other item of content in the same subgroup. Therefore, identifier engine 332 must then verify that the number of timeslots (e.g., 1 timeslot or 3 seconds) that match between the first item of content and the second item of content is at least equal to the recorded count (e.g., 5 time slots or 15 seconds) before membership to the subgroup is permitted.

In some implementations, identifier engine 332 may skip the step of counting the number of timeslots if the total number of timeslots that each member of the subgroup have in common with one another is identified in an index associated within the subgroup. For example, a subgroup may have an index indicating that the 5 members of the subgroup have 3 timeslots in common, where each timeslot is defined as a 15-second period of time. A timeslot may be of any length or duration, such as one frame, 5 frames, 10 frames, one second, five seconds, fifteen seconds, one minute, or any other length. In other implementations, subgroups may always be identified by a largest common portion of time (e.g. 30 seconds, 45 seconds, etc.), and thus may have a single, larger timeslot. Timeslots may thus represent file blocks or chunks, or complete scenes, sequences, introductory portions, or other segments of media. A chunk, for example, may include the file address of a video (e.g., C:\movie_rating_PG.mpg or/localhost/media/movie_rating_PG.mpg) of a 5-second clip stored on client device 300, displaying a rating of the selected item of content (e.g., the movie called "Groundhogs Week"). In another example, the identification of the chunk may be an address to a network location, such as a URL (e.g., www.example.com/groundhogs_week.mpg), where client device 300 can access the selected item of content, either by streaming the content directly to a video player on client device 300 or downloading the content directly to a storage location on client device 300 prior to rendering with the video player If the item of content passes the verification phase, then it is added to the same subgroup that the second item of content is a member of Identifier engine 332 then continues the process for the next item of content in multimedia content storage 232 until all items of content not assigned to subgroups have been scanned.

Content management server 318 may include an extractor/generator engine 336. An extractor/generator engine 336 may comprise an application, service, routine, server, daemon, or other executable logic for extracting the common portion from an item of content, as identified by the identifier engine 332. In one implementation, the common portion is identified as the portion contained in the number of timeslots equal to the timeslot count recorded by the identifier engine 332 for each item of content, as described above.

In addition, the extractor/generator engine 336 may generate a common media package that includes a common media identifier and a media payload. In one implementation, the common media identifier may include an address (e.g., C:\filename.mpeg) to a storage space located on or in communication with the client device. In other implementations, the common media identifier is an address to a network location (e.g., a URL). The media payload includes the extracted common portion, which may be converted into any video format (e.g., 3g2, 3gp, avi, fly, mov, mpeg-1, mpeg-2, mpeg-4, mpg), any audio file format (e.g., mp3), any archive format (e.g., zip), or any other known or later discovered media container formats. The extractor/generator engine 336 stores the common media package in a database, such as media package storage 334.

In some implementations, media content server 318 may execute a payment engine 334. Payment engine 334 may comprise an application, service, server, daemon, routine, or other executable logic for associating a creator, publisher, distributor, or sponsor of a first item of content with a paid second item of content inserted into a list responsive to a detected interaction with the first item of content. Payment engine 334 may provide revenue sharing from creators or publishers of paid content, such as advertising, to creators of popular first items of content that draw viewers, and/or indicate to a third-party payment system to provide payments and/or revenue sharing for such interactions. In some implementations, payment engine 334 may maintain a record or log of which items of content were inserted into and/or associated with a video, items of content that were interacted with, device identifiers of clients that interacted with the items, second items of content that were provided for inclusion in displayed lists, identifications of whether the second items of content were interacted with, etc. Payment engine 334 may compare durations of playback or viewing time to a monetization threshold to determine whether the item of content was viewed for a sufficient amount of time to charge the creator or publisher of paid content.

Figure 4:
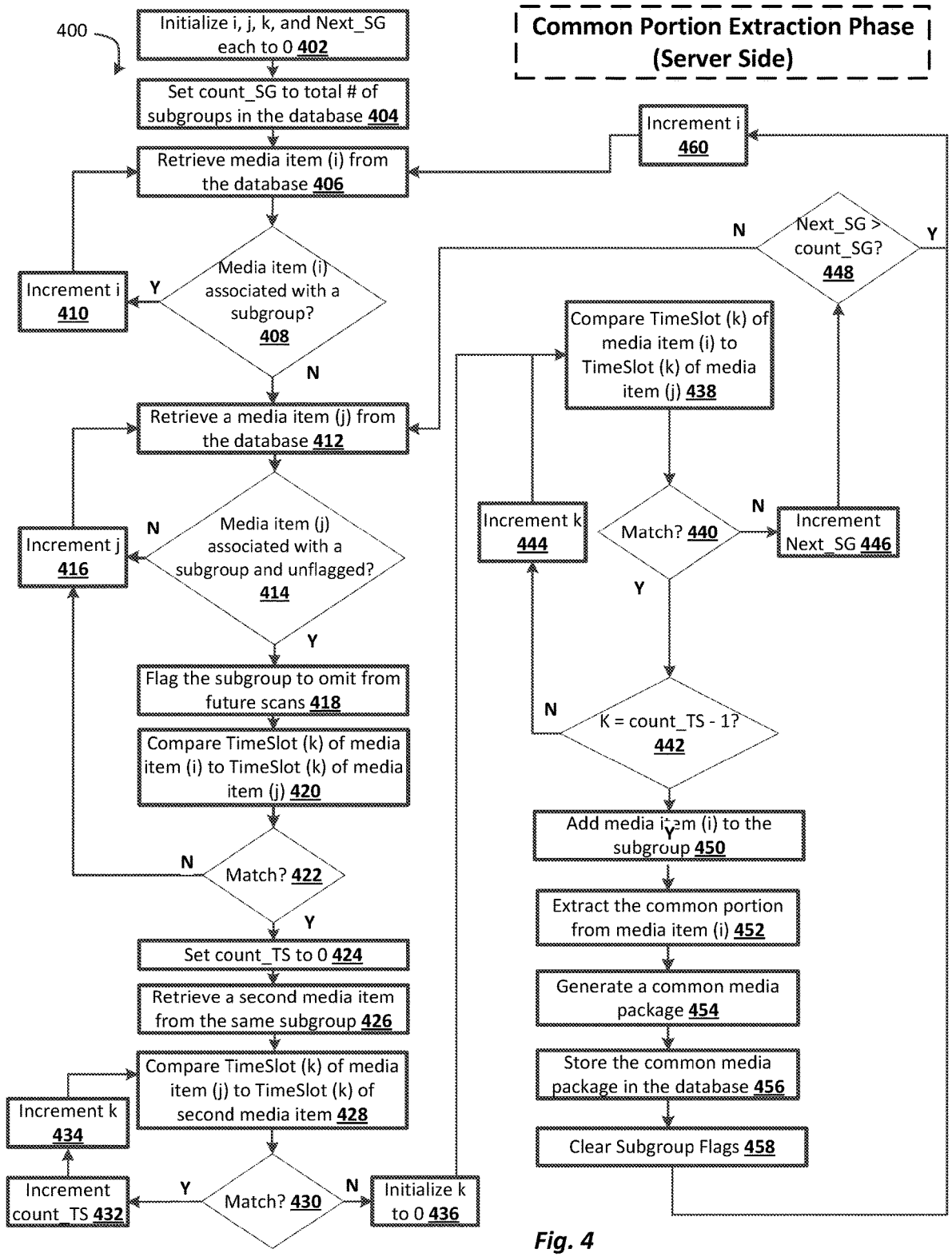
FIG. 4 is a flow diagram of the steps taken by a server in one implementation of an example process 400 for reducing bandwidth needed for streaming media content to a client device.

FIG. 4 is a flow diagram of the steps taken by a server in one implementation of an example process 400 for reducing bandwidth needed for streaming media content to a client device. In some implementations, the process 400 may be performed by, for example, the media content server 318. The process 400 may include an identification phase (steps 402-450) and an extraction/generation phase (steps 454-458). Each step may be re-ordered, added, or removed.

In one implementation of the identification phase of process 400, counters such as j, k, and Next_SG are each initialized to zero (step 402). Media content server 318 may select a media item not already assigned to a subgroup or subset of a plurality of media content items. Subgroups may comprise items of media that have been identified as having a common portion. Multiple subgroups may exist (e.g. items with a first common introduction, items with a common end such as a disclaimer or credits, etc.) and an item may be included in multiple subgroups. The total number of subgroups stored in a database are calculated and recorded to count_SG (step 404). Media item (i), an element of an array of media items, is retrieved from the database (step 406). If a media item (i) is already associated with a subgroup (step 408), then counter i is incremented by 1 (step 410), and the process returns to step 406, to be repeated. However, if a media item (i) is not associated with a subgroup (step 408), then media content server 318 proceeds to select a second media item, but one that is not already assigned to a subgroup. For example, media item (j), an element of the array of media items, is retrieved from the database (step 412). If media item (j) is either not associated with a subgroup or has been flagged to be omitted from future scans (step 414), then counter j is incremented by 1 (step 416), and the process returns to step 412 to be repeated. Accordingly, the system may iteratively traverse a database to select an media item that has not yet been identified within a subgroup. In other implementations, such as where an item is included in multiple subgroups, steps 408-410 may be skipped.

Continuing with process 400, if media item (j) is both associated with a subgroup and un-flagged (step 414), then media content server 318 flags the subgroup to omit it from future scans (step 418) and compares time slot (k) of media item (i) to timeslot (k) of media item (j) (step 420). In other words, at step 420, media content server 318 compares a window of the same points in time in the playback of each of the two videos. This window of time, referred to as a timeslot, may be separated in seconds, minutes, hours, or any other combination of time increments. Time slots may be of any length or duration, such as one frame, 5 frames, 10 frames, one second, five seconds, fifteen seconds, one minute, or any other length. If a match is not found (step 422), then counter j is incremented by 1 (step 416), and the process returns to step 412, to be repeated. However, if a match is found at step 422, then media content server 318 verifies that media item (i) should be added to the identified subgroup. In one embodiment, verification may include the determination that media item (i) has the same number of time slots in common with media item (j), that media item (j) has in common with all other members of the sub group.

Still referring to FIG. 4, media content server 318 starts the verification process by counting the total number of timeslots (e.g. frames, seconds, etc.) that each media item (from the subgroup identified at step 414) have in common with one another. For example, a counter such as count_TS is initialized to zero (step 424) and media content server 318 retrieves a second media item from the same subgroup (step 426). Media content server 318 compares time slot (k) of media item (j) to the same time slot of second media item (step 428). If a match is found (step 430), then both count_TS (step 432) and counter k (step 434) are each incremented by 1. However, if a match is not found at step 430, then counter k is initialized to zero (step 436) and media content server 318 proceeds to compare time slot (k) of media item (i) to the same time slot of media item (j) (step 438).

From the comparison at step 438, if a match is not found (step 440), then counter Next_SG is incremented by 1 (step 446) and media content server 318 determines whether there are any other subgroups remaining in the database (step 448). If all subgroups have been scanned, then media content server 318 increments counter i by 1 (step 460) and proceeds to step 406, to repeat the process for the next media item (i). Otherwise, at this point, media content server 318 has determined that media item (i) should not be added to the subgroup of the compared media item (j) and; thus, the next media item (j) should be retrieved (step 412) and the process repeated.

Returning to step 440, if time slot (k) of media item (i) matches the same timeslot of media item (j), then media content server 318 continues to check all remaining timeslots at steps 440, 442 and 444. If media item (i) has a number of time slots in common with media item (j) that is equal to a number of time slots that media item (j) has in common with the other media items of the subgroup, then media content server 318 has successfully identified at least one media item (e.g., media item (i)) that should be added to the subgroup. Accordingly, media content server 318 proceeds to add media item (i) to the sub group (step 450).

At step 452, media content server 318 extracts the common portion from media item (i). In some embodiments, the extraction of the common portion includes recording the playback of media content item (i) from time slot (0) to time slot (count_TS), where count_TS was previously calculated in steps 428, 430, 432, and 434. This extracted portion may then be stored temporarily (e.g., in RAM) or permanently (e.g., in ROM, in a database, as a flat file stored in a database).

In some embodiments, the common portion may not start at the beginning of the media item, and thus k may be equal to or greater than 0. Such a scenario may occur where media item (i) consists of more than one introduction scene. For example, the requested video content may be a movie about superheroes. The production company of the movie may have selected more than one video clip to precede the movie, such as a 30 second trailer about a race car movie, a 30 second commercial about car insurance, a 15 second message from the movie theatre requesting the audience members to disable the ringers on their cell phones, and a 5 second approval message (e.g., PG rating) from a rating organization. In the provided example, the portion of media item (i) that is common to a particular portion of media item (j) may start at time slot 1 and end at timeslot 3 (e.g. from 00:30 to 1:15). It should be recognized that the common portion may occur at any point in time in media (i) and any point in time in media (j).

Although, process 400 describes the extraction process of a single introduction scene from media item (i), other embodiments may include the identification and extraction of multiple introduction scenes as described in the aforementioned example. Similarly, although discussed as introduction scenes, in many implementations, identified common media portions may occur in the middle of or at the end of different media items (e.g. intermission segments, credits, disclaimers, term sheets, etc.).

In the extraction/generation phase of process 400, media content server 318 generates a common media package (step 454). In some embodiments, the common media package includes a common media identifier and a media payload, which includes the extracted common portion as described above. The common media identifier may include an address (e.g., C:\filename.mpeg or http://localhost/media/filename.mpeg) to a storage space located on the client device or an address to a network location (e.g., a URL) from which the common media package may be initially obtained. In other implementations, the address is only the filename of the common media package (e.g., filename.mpeg). The media payload may be stored in any video format (e.g., 3g2, 3gp, avi, flv, mov, mpeg-1, mpeg-2, mpeg-4, mpg), any audio file format (e.g., mp3), any archival format (e.g., zip), or any other known or later discovered media container formats.

At step 454, media content server 318 stores the common media package in a database and clears any flags set for the subgroups (step 458). Media content server 318 may increment counter i by 1 (step 460) and retrieve the next media item (i) from the data base (step 406), to repeat the entire process in some implementations.

Figure 5:
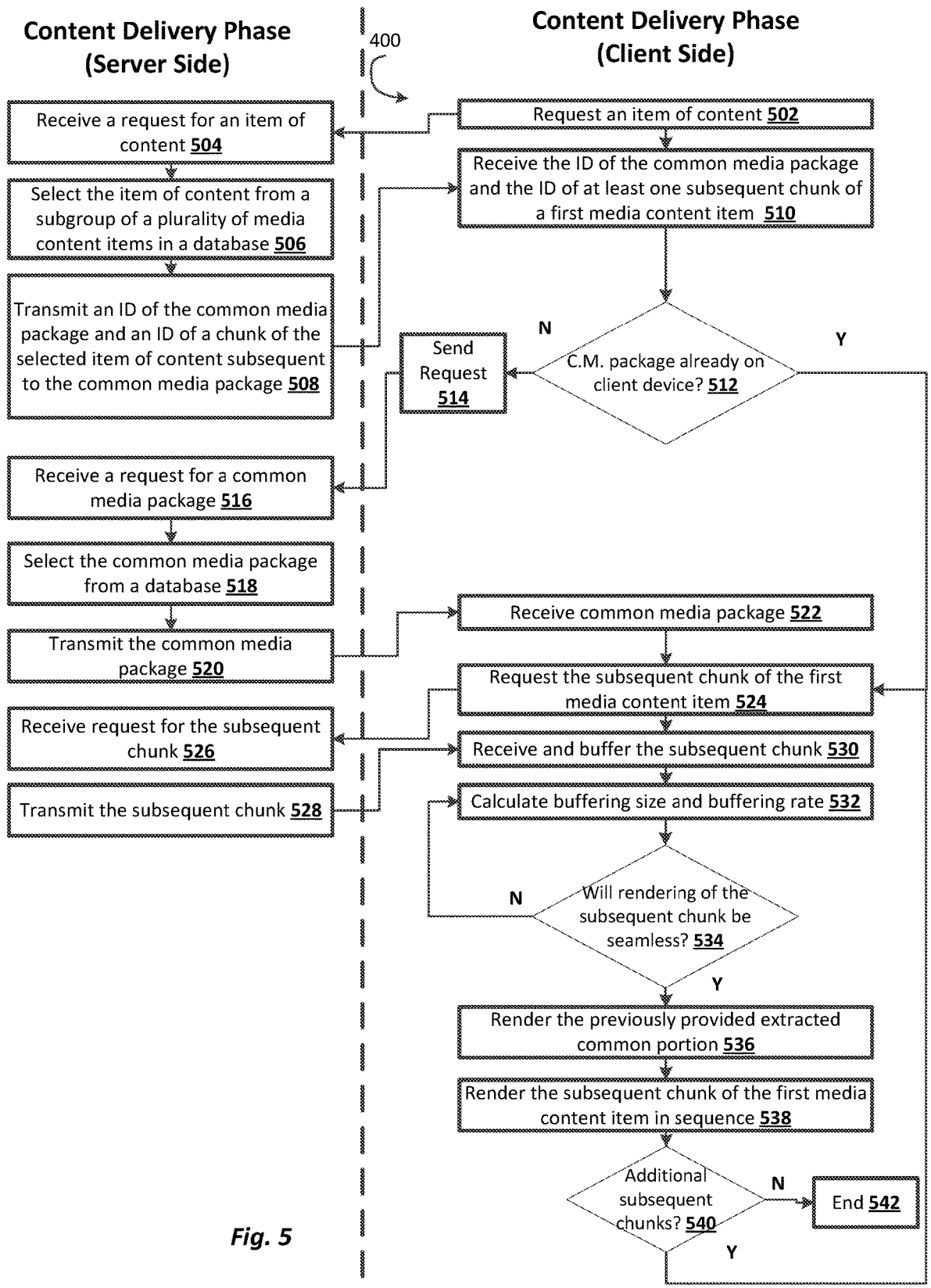
FIG. 5 is a flow diagram of the steps taken by a server and client device in one implementation of an example process 500 for reducing bandwidth needed for streaming media content to a client device.

FIG. 5 is a flow diagram of the steps taken by a server and client device in one implementation of an example process 500 for reducing bandwidth needed for streaming media content to a client device. Process 500 includes a content delivery phase where content is delivered from a server (the left side of the flow diagram) and received by a client device (the right side of the flow diagram). In some implementations, the process 500 may be performed by, for example, the media content server 318 and client device 300. Each step of process 500 may be re-ordered, added, or removed.

Client device 300 begins process 500 by requesting an item of content (step 502). The item of content may be any type of content including multimedia content (e.g., films, videos, cartoons, movies, streaming video) or sponsored content (advertisements in the form of pictures or multimedia). For example, the client device may request a movie or, in some implementations, the request may be for a video containing multiple items of multimedia content concatenated together into a single file, such as a first movie and a second movie. In addition, the video may begin with the display of a production brand (e.g., a symbol), a copyright disclaimer, an approved message from a ratings board (e.g., PG rating symbol), other common opening content (e.g., public service announcement). For example, the movie may begin with a 30 second trailer about the movie "Groundhogs Week." Each clip of multimedia content may be of any duration, such as in seconds, minutes, hours, or days.

Media content server 318 receives the request for the multimedia content (step 504) and proceeds to select the requested item from a subgroup or subset of a plurality of media content items in a database (step 506). In one implementation, the database may be contained within media content server 318 or it may be in any other database in communication with media content server 318. In addition, each subgroup of the plurality of media content items may previously been constructed by process 400, as shown in FIG. 4.

Still referring to FIG. 5, media content server 318 delivers or transmits an identification of the common media package and an identification of a portion, segment, or block of the selected item of content, frequently referred to as a "chunk", subsequent to the common media package (step 508). For example, the identification of the common media package may include the file address (e.g., C:\movie_rating_PG.mpg or /localhost/media/movie_rating_PG.mpg) of a 5-second clip stored on client device 300, displaying a rating of the selected item of content (e.g., the movie called "Groundhogs Week"). In another example, the identification of the chunk may be an address to a network location, such as a URL (e.g., www.example.com/groundhogs_week.mpg), where client device 300 can access the selected item of content, either by streaming the content directly to a video player on client device 300 or downloading the content directly to a storage location on client device 300 prior to rendering with the video player. In one implementation, the items may be delivered through wired or wireless channels (infrared, Bluetooth, WIFI, cellular networks, or any other mobile communication channels). In many implementations, the identification of the common media package and portions or chunk(s) of the content may be delivered as a manifest or list of chunks of the content item. For example, the manifest may comprise an XML file or similar file including metadata about the content item (e.g. title, artist, publisher, genre, size, total duration, etc.), and may include URLs of each chunk of the content item (e.g. [address]/content_chunk1.mpg, [address]/content_chunk2.mpg, etc.). The client device may retrieve each of the chunks in turn and buffer and/or play back the chunks of media. One or more of the chunk URLs may be replaced with the identifier of the common media package stored on the client device, such that when retrieving and playing the chunks, the client's media player may retrieve the common media package from the local address rather than re-retrieving the package from an external device.

The transmission by media content server 318 is received by client device 300, which prompts client device 300 to inquire whether the common media package has already been stored on client device 300 (step 512). For example, media content server 318 may have previously transmitted or pushed the common media package to one or more client devices including client device 300, without receiving a request by client device 300. The push of the common media package may be based on one or more triggering events such as a modification to the common media package (e.g., updates), a time event (e.g., a specific time of day, week, month, year, or any other time combination), calendar events, updates to a file describing the user's interest (e.g., a cookie file located on the client device shows that the client now has an interest in sailboats), or search requests made by the user. In other implementations, the client may previously have retrieved the common media package, such as during streaming of a different content item. At step 512, if the common media package is determined to have not been previously received and stored, client device 300 sends a request, to media content server 318, for a copy of the common media package (step 514). In one such implementation, the manifest may include both a local address and an alternate address for the common media package, such that the application may attempt to retrieve the common media package locally and, upon failure, may request the package from the alternate, external address.

Upon receiving the request (step 516), media content server 318 selects the common media package from a database (step 618) and transmits the common media package to client device 300 (step 520). After receiving the common media package (step 522), client device 300 proceeds to step 524, which is described in detail below.

Referring back to step 512, if client device 300 already has a copy of the common media package stored locally, then client device 300 may proceed to request the subsequent chunk of the first media content item (step 524). For example, client device 300 may have requested (at step 502) the 2-hour movie "Groundhogs Week," which may begin with a 5-second introductory clip displaying the movie rating as PG (Parental Guidance required). Thus, in this example, the requested item of content has a duration of 2 hours and 5 seconds. In one such implementation, upon receiving the request, media content server 318 provides client device 300 with a URL to the 2-hour movie without the beginning 5-second introductory movie rating clip. In other implementations, such as with streamed media, as discussed above, the media content server may provide a manifest for the movie including one or more chunk URLs and addresses or identifiers for one or more common media packages, such as a first identifier for the 5-second introductory movie rating clip and one or more URLs for chunks of the two hour movie. In some embodiments, the request is for the content to stream to a video player (e.g., video player 102) on client device 300 or a request to download and store the content on client device 300.

Upon receiving the request (step 526), media content server 318 transmits, to client device 300, the subsequent portion or chunk of the selected item of content (step 520). As previously discussed, the form of the delivered content is based on the request type (i.e., streaming versus downloaded). In the case of streaming content, the subsequent chunk may need to be buffered on the client device prior to the start of the video playback on video player 102 to ensure a seamless rendering of both the common media package and the subsequent chunk. For example, if video player 102 starts the playback of the 5-second clip of the PG movie rating before enough subsequent chunks of the "Groundhogs Week" movie is buffered on client device 300, video player 102 may be unable to display the beginning of "Groundhogs Week" at or near the ending of the 5-second PG movie rating. Thus, in some implementations, both the size of the subsequent chunk and the transmission rate over the network (from server to client device) may help to determine when client device 300 has received enough of the subsequent chunk for a seamless video playback experience for client device 300.

Accordingly, client device 300 may calculate the size of the buffered content, and/or measure the buffering or transmission rate (step 532). If the client device 300 determines, based on these two parameters, that the video playback may not be seamless if the video playback were to begin at this point in time, process 500 may return to step 532, to be repeated. Otherwise, client device 300 may begin the rendering of the previously extracted common portion, e.g., the 5-second movie rating clip, (step 536), followed by the seamless rendering of the subsequent chunk of the first media content item in the sequence (step 538).

In some implementations, client device 300 may request more than one subsequent chunk, such as a first ten second segment and a second ten second segment of the movie (both segments subsequent to the common introduction segment). The chunks may be delivered by the same media server or a different media server, allowing load balancing and request distribution as necessary.

Thus, process 500 determines whether additional subsequent chunks must be requested (step 540). If so, process 500 returns to step 512, to repeat the process. Otherwise, process 500 ends at step 542.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user. In many implementations, data collected about a user may be anonymized or disambiguated to protect privacy. In many implementations in which personal information about the user of client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to a content media server. In addition, certain data may be treated in one or more ways before it is stored or used by an audience measurement server, so that personally identifiable information is removed when generating parameters (e.g., demographic parameters).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including a programmable processor, a computer, a system on a chip, or multiple ones or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks can include various combinations of a local area network ("LAN"), a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). Client devices receiving content and providing relay pings, identifiers, or other data to an audience measurement service and/or panel provider may be smart television modules. The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

One implementation disclosed herein is a method for reducing bandwidth needed for streaming media content. The method includes identifying, by the streaming media server, a subset of a plurality of media content items having a portion of media data in common and extracting, by the streaming media server, the common portion from a first media content item of the subset. The method also includes generating, by the streaming media server, a common media package comprising the extracted common portion, providing, by the streaming media server to a client media device, the common media package, and receiving, by the streaming media server from the client media device, a request for an item of content. The method also includes selecting, by the streaming media server, an item of content from the subset of the plurality of media content items; and transmitting, by the streaming media server to the client media device, an identification of the common media package and an identification of a chunk of the selected item of content subsequent to the common portion, to trigger the client media device to render the previously provided common media package and request the subsequent chunk of the selected item of content.

In some implementations, the method includes receiving, by the streaming media server from the client media device, a second request for an item of content, selecting, by the streaming media server, a second item of content from the subset of the plurality of media content items; and transmitting, by the streaming media server to the client media device, the identification of the common media package and an identification of a chunk of the selected second item of content subsequent to the common portion, to trigger the client media device to render the previously provided common media package and request the subsequent chunk of the selected second item of content.

In some implementations, the method includes identifying the subset of the plurality of media content items having a common portion of the media by comparing a portion of a first media content item of the plurality of media content items to a corresponding portion of a second media content item of the plurality of media content items; and adding the first media content item and second media content item to the subset, responsive to the comparison indicating a match. In other implementations, the method includes generating a common media identifier and a media payload comprising the extracted common portion. In still other implementations, the method includes transmitting a manifest comprising an address in a cache of the client media device of the common media package, and an address of the chunk of the selected item of content at a content server.

In some implementations, the method includes transmitting the subsequent chunk of the selected item of content for rendering by the client media device, by the streaming media server, prior to receipt of the request for the subsequent chunk. In other implementations, the method includes assigning, by the streaming media server, to each item of content in the subset of the plurality of media content items, a first predetermined quality score; and assigning, by the streaming media server, to each item of content in a second, non-overlapping subset of the plurality of media content items, a second predetermined quality score, the second quality score lower than the first quality score. In yet still other implementations, the method includes transmitting an instruction for the client to modify the common media package based on the characteristics of the subsequent chunk of the selected item of content.

In another aspect, the present disclosure is directed to a system for reducing bandwidth needed for streaming media content. The system includes a computing device comprising a streaming media server and a video splitter. In some implementations the system includes a video encoder, in communication via a network to a client media device and a storage device, the storage device storing a plurality of media content items. The streaming media server includes circuitry configured to identify a subset of the plurality of media content items stored in the storage device having a portion of media data in common. The video splitter includes circuitry configured to extract the common portion from a first media content item of the subset. In some implementations, the video encoder includes circuitry configured to generate a common media package comprising the extracted common portion.

In still other implementations, the circuitry of the streaming media server is configured to provide, to the client media device via the network, the common media package, receive, from the client media device, a request for an item of content, select an item of content from the subset of the plurality of media content items, and transmit, to the client media device, an identification of the common media package and an identification of a chunk of the selected item of content subsequent to the common portion, to trigger the client media device to render the previously provided common media package and request the subsequent chunk of the selected item of content.

In some implementations, the system includes circuitry of the streaming media server further configured to receive, from the client media device, a second request for an item of content, select a second item of content from the subset of the plurality of media content items; and transmit, to the client media device, an identification of the common media package and an identification of a chunk of the selected second item of content subsequent to the common portion, to trigger the client media device to render the previously provided common media package and request the subsequent chunk of the selected second item of content.

In some implementations, the system includes circuitry of the streaming media server further configured to identify the subset of the plurality of media content items having a common portion of the media further comprises comparing a portion of a first media content item of the plurality of media content items to a corresponding portion of a second media content item of the plurality of media content items; and add the first media content item and second media content item to the subset, responsive to the comparison indicating a match. In other implementations, the system includes circuitry of the streaming media server further configured to generate the common media package further comprises generating a common media identifier and a media payload comprising the extracted common portion.

In some implementations, the system includes circuitry of the streaming media server further configured to transmit the identification of the common media package and the identification of the chunk of the selected item of content further comprises transmitting a manifest comprising an address in a cache of the client media device of the common media package, and an address of the chunk of the selected item of content at a content server. In other implementations, the circuitry of the streaming media server is further configured to transmit the subsequent chunk of the selected item of content for rendering by the client media device, by the streaming media server, prior to receipt of the request for the subsequent chunk.

In some implementations, the system of claim 9 includes circuitry of the streaming media server further configured to assign, by the streaming media server, to each item of content in the subset of the plurality of media content items, a first predetermined quality score; and assign, by the streaming media server, to each item of content in a second, non-overlapping subset of the plurality of media content items, a second predetermined quality score, the second quality score lower than the first quality score, and assign, by the streaming media server, to each item of content in a second, non-overlapping subset of the plurality of media content items, a second predetermined quality score, the second quality score lower than the first quality score. In still other implementations, the system includes circuitry of the streaming media server further configured to transmit the identification of the common media package and the identification of the chunk of the selected item of content further comprises transmitting an instruction for the client to modify the common media package based on the characteristics of the subsequent chunk of the selected item of content.

In another aspect, the present disclosure is directed to a method for reducing bandwidth needed for streaming media content. The method includes determining, by the client media device, a common media package is not stored on the client media device; the common media package comprises an identifier of the common media package and an extracted common portion from a plurality of media content items. In some implementations, the method includes receiving, by the client media device from a streaming media server device, the common media package and requesting, by the client media device from the streaming media server, an item of content. In some implementations, the method includes receiving, by the client media device from the streaming media server, the identifier of the common media package and an identification of a subsequent chunk of a first media content item selected from the plurality of media content items, and requesting, by the client media device, the subsequent chunk of the first media content item. In other implementations, the method includes receiving, by the client media device, the subsequent chunk of the first media content item; and rendering, by the client media device, the previously provided extracted common portion and the subsequent chunk of the first media content item in sequence.

In some implementations, the method includes requesting, by the client media device from the streaming media server, a second item of content, and receiving, by the client media device from the streaming media server, the identifier of the common media package and an identification of a subsequent chunk of a second media content item selected from the plurality of media content items. In other implementations, the method includes requesting, by the client media device, the subsequent chunk of the second media content item; receiving, by the client media device, the subsequent chunk of the second media content item; and rendering, by the client media device, the previously provided extracted common portion and the subsequent chunk of the second media content item in sequence.

In some implementations, the method includes receiving the common media package further comprises receiving an instruction for the client media device to modify the extracted common portion based on the characteristics of the received subsequent chunk of the selected item of content. In other implementations, the method includes receiving the subsequent chunk of the first media content item further comprises receiving the subsequent chunk while rendering the previously provided extracted common portion.

These implementations are mentioned not to limit or define the scope of the disclosure, but to provide an example of an implementation of the disclosure to aid in understanding thereof. Particular implementations may be developed to realize one or more of the following advantages.

What is claimed is:

1. A method for reducing bandwidth needed for streaming media content, comprising:
   identifying, by a streaming media server, a subset of a plurality of media content items having a portion of media data in common by:
      comparing a portion of a first media content item of the plurality of media content items to a corresponding portion of a second media content item of the plurality of media content items, and
      responsive to the comparison indicating a match, adding the first media content item and the second media content item to the subset;
   extracting, by the streaming media server, the common portion from the first media content item of the subset;
   generating, by the streaming media server, a common media package comprising the extracted common portion;
   providing, by the streaming media server to a client media device, the common media package;
   receiving, by the streaming media server from the client media device, a request for an item of content;
   selecting, by the streaming media server, an item of content from the subset of the plurality of media content items; and
   transmitting, by the streaming media server to the client media device, an identification of the common media package and an identification of a chunk of the selected item of content subsequent to the common portion, to trigger the client media device to render the previously provided common media package and request the subsequent chunk of the selected item of content.

2. The method of claim 1, wherein identifying the subset of a plurality of media content items further comprises:
   determining a number of matching timeslots of the media content item and a second media content item of the subset of the plurality of media content items;
   determining a number of matching timeslots of the second media content item and a third media content item of the subset of the plurality of media content items;
   adding the first media content item to the subset of the plurality of media content items responsive to the number of matching timeslots of the first media content item and the second media content being at least equal to the number of matching timeslots between the second media content item and the third media content item.

3. The method of claim 1, wherein generating the common media package further comprises generating a common media identifier and a media payload comprising the extracted common portion.

4. The method of claim 1, wherein transmitting an identification of the common media package and an identification of a chunk of the selected item of content subsequent to the common portion further comprises:
   triggering the client media device to render the previously provided common media package concurrently to the streaming media server providing the client media device the subsequent chunk of the selected item of content.

5. The method of claim 1, further comprising:
   transmitting the subsequent chunk of the selected item of content for rendering by the client media device, by the streaming media server, prior to receipt of the request for the subsequent chunk.

6. The method of claim 1,
   wherein transmitting the identification of the common media package and the identification of the chunk of the selected item of content further comprises transmitting an instruction for the client to modify the common media package based on the characteristics of the subsequent chunk of the selected item of content.

7. A method for reducing bandwidth needed for streaming media content, comprising:
   identifying, by a streaming media server, a subset of a plurality of media content items having a portion of media data in common;
   assigning, by the streaming media server, to each item of content in the subset of the plurality of media content items, a first predetermined quality score;
   assigning, by the streaming media server, to each item of content in a second, non-overlapping subset of the plurality of media content items, a second predetermined quality score, the second quality score lower than the first quality score;
   extracting, by the streaming media server, the common portion from a first media content item of the subset;
   generating, by the streaming media server, a common media package comprising the extracted common portion;
   providing, by the streaming media server to a client media device, the common media package;
   receiving, by the streaming media server from the client media device, a request for an item of content;
   selecting, by the streaming media server, an item of content from the subset of the plurality of media content items; and
   transmitting, by the streaming media server to the client media device, an identification of the common media package and an identification of a chunk of the selected item of content subsequent to the common portion, to trigger the client media device to render the previously provided common media package and request the subsequent chunk of the selected item of content.

8. A system, for reducing bandwidth needed for streaming media content, comprising:
   a computing device comprising a streaming media server, a video splitter, and a video encoder, in communication via a network to a client media device and a storage device, the storage device storing a plurality of media content items;

wherein the streaming media server comprises circuitry configured to:
    identify a subset of the plurality of media content items stored in the storage device having a portion of media data in common by:
        comparing a portion of a first media content item of the plurality of media content items to a corresponding portion of a second media content item of the plurality of media content items; and
        adding the first media content item and the second media content item to the subset, responsive to the comparison indicating a match;
wherein the video splitter comprises circuitry configured to:
    extract the common portion from the first media content item of the subset;
wherein the video encoder comprises circuitry configured to:
    generate a common media package comprising the extracted common portion;
wherein the circuitry of the streaming media server is further configured to:
    provide, to the client media device via the network, the common media package,
    receive, from the client media device, a request for an item of content,
    select an item of content from the subset of the plurality of media content items, and
    transmit, to the client media device, an identification of the common media package and an identification of a chunk of the selected item of content subsequent to the common portion, to trigger the client media device to render the previously provided common media package and request the subsequent chunk of the selected item of content.

9. The system of claim 8, wherein the circuitry of the streaming media server is further configured to identify the subset of the plurality of media content items having a common portion of the media further by:
    determining a number of matching timeslots of the first media content item and a second media content item of the subset of the plurality of media content items;
    determining a number of matching timeslots of the second media content item and a third media content item of the subset of the plurality of media content items; and
    adding the first media content item to the subset of the plurality of media content items responsive to the number of matching timeslots of the first media content item and the second media content being at least equal to the number of matching timeslots between the second media content item and the third media content item.

10. The system of claim 8, wherein circuitry of the streaming media server is further configured to generate the common media package further by:
    generating a common media identifier and a media payload comprising the extracted common portion.

11. The system of claim 8, wherein circuitry of the streaming media server is further configured to transmit an identification of the common media package and an identification of a chunk of the selected item of content subsequent to the common portion by:
    triggering the client media device to render the previously provided common media package concurrently to the streaming media server providing the client media device the subsequent chunk of the selected item of content.

12. The system of claim 8, wherein circuitry of the streaming media server is further configured to:
    transmit the subsequent chunk of the selected item of content for rendering by the client media device prior to receipt of the request for the subsequent chunk.

13. The system of claim 8, wherein circuitry of the streaming media server is further configured to:
    assign, by the streaming media server, to each item of content in the subset of the plurality of media content items, a first predetermined quality score; and
    assign, by the streaming media server, to each item of content in a second, non-overlapping subset of the plurality of media content items, a second predetermined quality score, the second quality score lower than the first quality score.

14. The system of claim 8, wherein circuitry of the streaming media server is further configured to transmit the identification of the common media package and the identification of the chunk of the selected item of content by:
    transmitting an instruction for the client to modify the common media package based on the characteristics of the subsequent chunk of the selected item of content.

15. A method for reducing bandwidth needed for streaming media content, comprising:
    determining, by a client media device, a common media package is not stored on the client media device, the common media package comprising an identifier of the common media package and an extracted common portion from a plurality of media content items;
    receiving, by the client media device from a streaming media server device, the common media package,
        the common media package generated by the streaming media server device responsive to a comparison between a portion of a first media content item of the plurality of media content items and a corresponding portion of a second media content item of the plurality of media content items indicating a match and an addition of the first media content item and the second media content item to a subset of the plurality of media content items;
    requesting, by the client media device from the streaming media server, an item of content;
    receiving, by the client media device from the streaming media server, the identifier of the common media package and an identification of a subsequent chunk of the first media content item selected from the plurality of media content items;
    requesting, by the client media device, the subsequent chunk of the first media content item;
    receiving, by the client media device, the subsequent chunk of the first media content item; and
    rendering, by the client media device, the previously provided extracted common portion and the subsequent chunk of the first media content item in sequence.

16. The method of claim 15, further comprising:
    requesting, by the client media device from the streaming media server, a second item of content;
    receiving, by the client media device from the streaming media server, the identifier of the common media package and an identification of a subsequent chunk of a second media content item selected from the plurality of media content items;
    requesting, by the client media device, the subsequent chunk of the second media content item;
    receiving, by the client media device, the subsequent chunk of the second media content item; and rendering, by the client media device, the previously provided extracted common portion and the subsequent chunk of the second media content item in sequence.

17. The method of claim 15, wherein rendering the previously provided extracted common portion further comprises receiving a portion of the subsequent chunk of the first media content while rendering the previously provided extracted common portion.

18. The method of claim 15, wherein rendering the previously provided extracted common portion further comprises:
   determining a size of a portion of the subsequent chunk of the first media content transmitted to the client media device;
   determining a transmission rate of the subsequent chunk of the first media content; and
   rendering the previously provided extracted common portion responsive to the size and the transmission rate satisfying a characteristic.

* * * * *